United States Patent [19]
Sarachan

[11] Patent Number: 5,634,054
[45] Date of Patent: May 27, 1997

[54] DOCUMENT-BASED DATA DEFINITION GENERATOR

[75] Inventor: Brion D. Sarachan, Albany, N.Y.

[73] Assignee: General Electric Company, Schenectady, N.Y.

[21] Appl. No.: 503,296

[22] Filed: Jul. 17, 1995

Related U.S. Application Data

[63] Continuation of Ser. No. 215,531, Mar. 22, 1994, abandoned.

[51] Int. Cl.$^6$ .................................................. G06F 7/00
[52] U.S. Cl. ........................................ 395/611; 395/500
[58] Field of Search ...................................... 395/500, 600

[56] References Cited

U.S. PATENT DOCUMENTS

| | | | |
|---|---|---|---|
| 4,933,984 | 6/1990 | Nakano et al. | 382/61 |
| 5,075,895 | 12/1991 | Bessho | 382/61 |
| 5,097,408 | 3/1992 | Huber | 395/600 |
| 5,119,437 | 6/1992 | Kuwamura et al. | 382/9 |
| 5,201,046 | 4/1993 | Goldberg et al. | 395/600 |
| 5,202,996 | 4/1993 | Sugino et al. | 395/700 |
| 5,235,654 | 8/1993 | Anderson et al. | 382/61 |

OTHER PUBLICATIONS

Law et al., "Managing Design Objects in a Sharable Relational Framework", Proceedings of the 1990 ASME International Computer in Engineering Conference and Exposition, 1990, pp. 61–66.

*Primary Examiner*—Jack B. Harvey
*Assistant Examiner*—David A. Wiley
*Attorney, Agent, or Firm*—David C. Goldman; Marvin Snyder

[57] ABSTRACT

The present invention discloses a document-based data definition generator. The document-based data definition generator provides data definitions for a document-base data model created by an engineer. The data definition generator receives the document-based data model and scans it for tables located therein. Upon locating a table, the data definition generator initializes a schema definition. An entity is defined in accordance with the table title and each table heading and table row are subsequently interpreted. After each table row has been interpreted, attributes are added. At the end of each table, the data definitions are generated in accordance with the defined schema, entity, and attributes. The generated data definitions are embedded within an integrated engineering computer environment in an engineering database and engineering software applications.

8 Claims, 3 Drawing Sheets

TABLE 18: VARIABLES IN THE HELIX OBJECT

| FIELD NAME | DESCRIPTION | DATA TYPE | DEFAULT VALUE | UNITS | CAT | IN | OUT |
|---|---|---|---|---|---|---|---|
| FREQUENCY | Operating frequency of the tube | REAL | | GHz | ob | tw,mg,mk | tw |
| BEAM VOLTAGE | Operating beam voltage | REAL | | kV | ob | tw,mg,mk | tw |
| BEAM RADIUS | Radius of the electron beam | REAL | | in | ob | tw,mg,mk | tw |
| HELIX RADIUS | Average helix circuit radius | REAL | | in | ob | tw,mk,esp, mg | tw |
| FILL FACTOR | Ratio of beam to helix radius | REAL | | | ob | tw | tw |
| BACKWALL RADIUS | Backwall radius | REAL | | in | ob | tw,mk,esp, mg | tw | fig. 2

DOCUMENT-BASED DATA DEFINITION GENERATOR

This application is a continuation of application Ser. No. 08/215,531 filed Mar. 22, 1994, now abandoned.

GOVERNMENT SUPPORT

This invention was made with Government support under Government Contract #MDA927-92-C-0027 awarded by the Defense Advanced Research Projects Agency (DARPA).

BACKGROUND OF THE INVENTION

1. Field of the Invention

The present invention relates generally to computer database management systems and more particularly to generating data definitions to engineering databases and engineering software.

2. Description of the Related Art

The effectiveness of integrated engineering design systems depends on efficient access of data. Typical data is stored and available in databases, but it is rarely in the form that is suitable for access from engineering design software. Great benefits in cycle-time reduction are achieved by integrating software tools used by the engineers. Integration requires that different software tools work against a consistent model of engineering data. There are many different techniques for representing a data model such as using database languages, information modeling languages, programming languages, and graphical representations. For instance, the Object Modeling Technique (OMT) and the associated OMTool disclosed in Rumbaugh et al., *Object-Oriented Modeling and Design*, Prentice-Hall (1991), provides a high level of abstraction to a particular engineering problem, but requires the understanding of complex diagrams detailing the relationships between objects defined for the problem. OMT provides a notation for representing different types of relationships among objects, including associations, aggregations, and generalizations. These relationship types are typically understood by a database expert, but are difficult for engineers to understand who are not computer specialists.

SUMMARY OF THE INVENTION

The present invention has solved the problems associated with the above mentioned data representing techniques by providing a document-based data definition generator that generates data definitions for tables located in a computer generated document-based data model. Upon locating a table within the document-based data model the data definition generator initializes a schema definition. An entity is defined in accordance with the table title and each table heading and table row are subsequently interpreted. After each table row has been interpreted, attributes for the entity are added. At the end of each table, data definitions are generated in accordance with the schema, entity, and attributes, and are integrated in an engineering computer environment such as an engineering database or an engineering software application.

Therefore, it is a primary objective of the present invention to provide a technique for representing data that is not complex and is easily understood.

Another object of the present invention is to enable the knowledge of engineering data models to be captured in computer-processible form.

Another object is to provide engineers with an easy-to-use document based means for representing engineering data models.

Still another object is to provide a document-based data definition generator that is capable of being used in integrated systems of engineering software.

Another object is to provide a document-based data definition generator that is capable of reducing design and manufacturing cycle time.

Thus, in accordance with the present invention, there is provided a document-based data definition generator. The document-based data definition generator includes a means for receiving a document-based data model having a plurality of tables located therein. Each table has a title, headings, and rows of data for each heading. A locating means locates a table within the document-based data model. An initializing means initializes a schema definition for the located table. An identifying means identifies the table title and initializing an entity definition for the defined schema. An interpretating means interprets each table heading and table row. A providing means provides attributes for each table row. A generating means generates a data definition in accordance with the defined schema, entity, and attributes.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIG. 2 is an example of a table in which data definitions are generated from.

DETAILED DESCRIPTION OF THE PRESENT INVENTION

Figure 1:
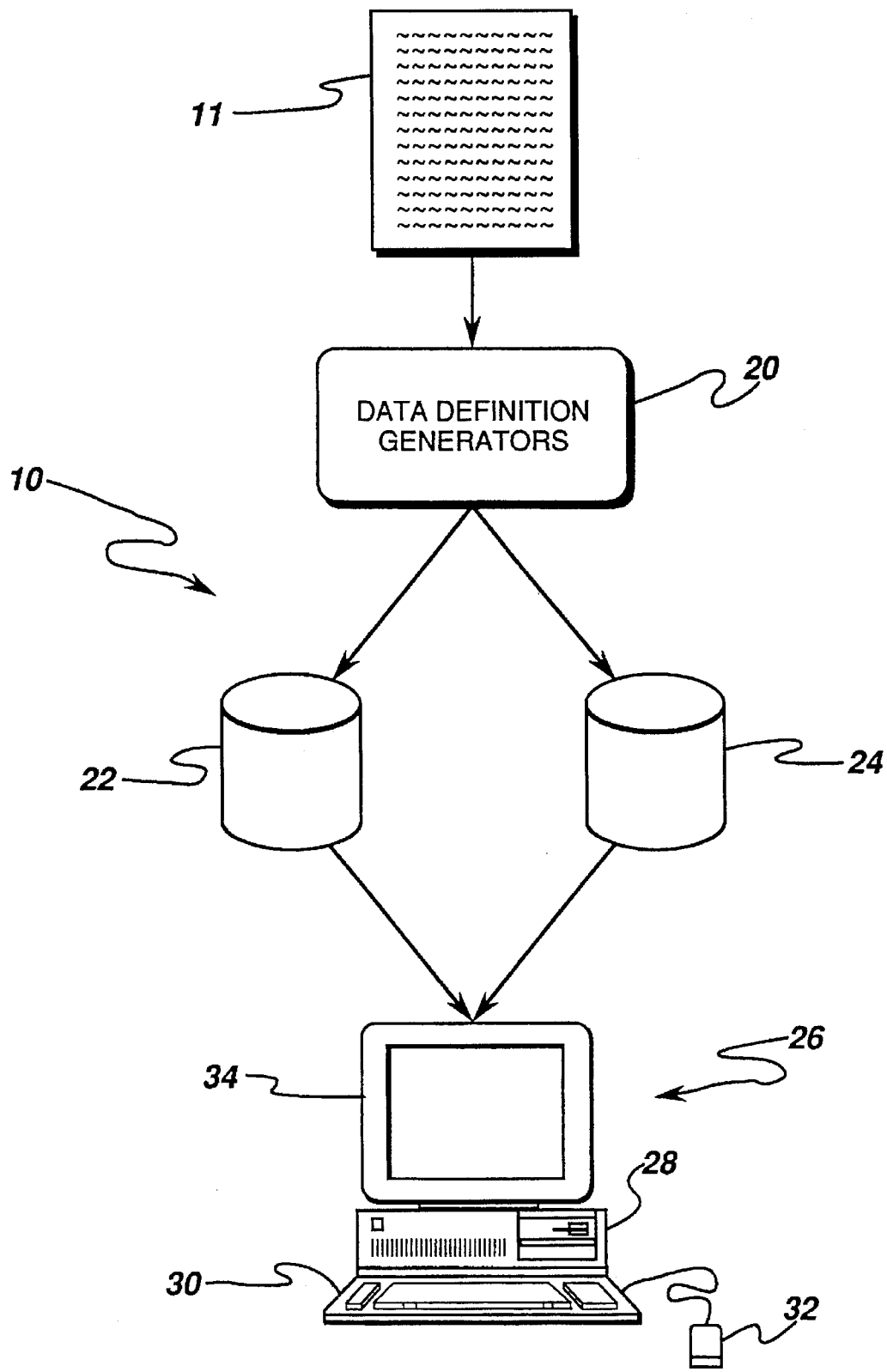
FIG. 1 is a schematic of the present invention.

A block diagram illustrating the operation of a document-based data definition generator 10 is provided in FIG. 1. The document-based data definition generator a receives a document-based data model 11 generated by an engineer from a commercially available word processing package such as Microsoft Word, Framemaker, or the like. Within the document-based data model are text and a plurality of tables for a particular application. An example of a table 12 used for microwave vacuum tube design is shown in FIG. 2. The table includes a table title 14, table headers 16, and rows of data 18 for each table header. In FIG. 2, the table title is "Table 18 Variables In The Helix Object" and table headers are Field Name; Description; Data Type; Default Value; Units; Category; Input; and Output. For instance, in the first row, the field name is frequency; the description is the operating frequency of the tube; the data type is a real number; the units are gigahertz; the category is an object (i.e. ob) database; and the input indicates that data is input to engineering software tools such as TWICE (tw), MAGIC (mg), and MASK (mk); and the output indicates that data is sent from TWICE (tw). The table in FIG. 2 is provided as an illustration of a particular use of the present invention and is not meant to be limiting to this specific use.

The document-based data model provided by the engineers are received by a data definition generator 20. The data definition generator scans the document-based data model for tables containing data and automatically generates data definitions for the data set forth in the tables. The generated data definitions are sent to either an engineering database 22 or an engineering software application 24. Both the engineering database and the engineering software application are integrated in a computer 26 environment. The computer is preferably a personal computer or the like, but is more typically part of a larger network based system having a plurality of workstations. The computer 26 is run by application software embodied in a hard drive 28 and communicates with the engineering databases 22 and engineering software 24 via a keyboard 30 and a mouse 32. The results are displayed on a display 34.

Figure 3:
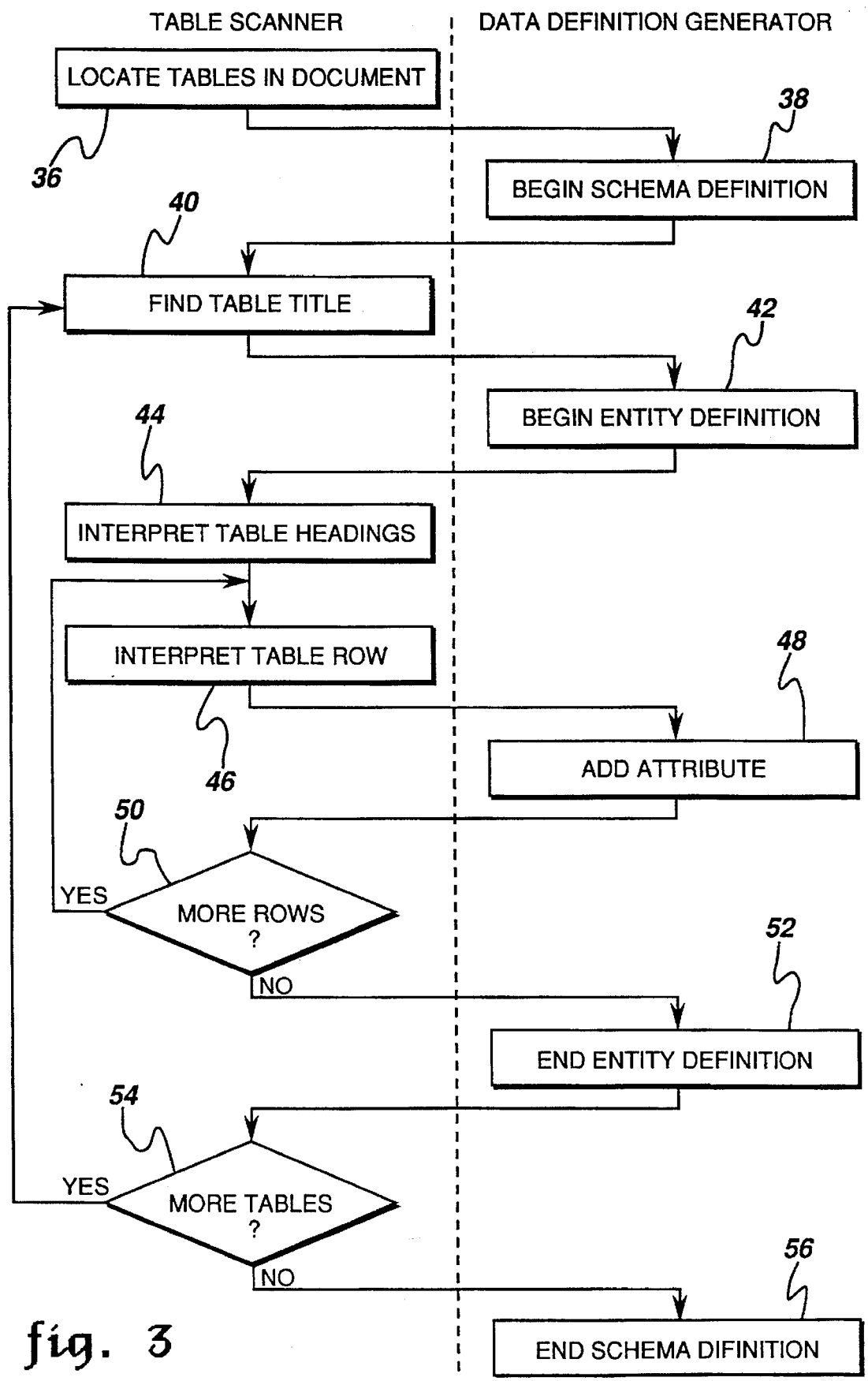
FIG. 3 is a flow chart detailing the creation of data definitions.

A flow-chart illustrating the operation of the data definition generator 20 is set forth in FIG. 3. Note that the flow-chart in FIG. 3 is divided into two sections; a) a section that scans tables and b) a section that generates the data definitions. After receiving a document-based data model, the text in the document is skipped and the tables in the document-based data model are located at block 36. A schema description of a database is initialized at block 38 using the data definition language provided by a database management system (DBMS). The schema defines a particular view of some aspect of the database. More specifically, it defines the attributes or fields that are visible, the domains (i.e. permissible values) of the attributes, and information concerning the form and location of the attributes. In the present invention, the schema definition depends on the type of database (i.e. relational, hierarchical, network, object, etc.) selected. After initializing the schema definition, the table title is located at block 40. In the table in FIG. 2, the table title is "Table 18 Variables In The Helix Object". From the table title, an entity is defined at block 42. An entity is an object of interest about which data is collected. In FIG. 2, the defined entity would be helix. An entity can subsume a number of attributes as provided in the table headings. Thus, at block 44, the table headings are interpreted and each table row is interpreted at block 46. After each row has been interpreted, the attributes are added at block 48. For example, in the table of FIG. 2, the attributes would be frequency, beam voltage, beam radius, helix radius, fill factor, and backwall radius. After adding the attributes, a determination is made at block 50 to ascertain whether there are more rows in the table to interpret. If there are more rows, then the next table row is interpreted at block 46 and the attributes are added at block 48. This loop continues until all of the rows have been interpreted. When all of the rows have been interpreted, the entity definition is ended at block 52. Next, a determination is made at block 54 to determine whether there are more tables located in the document-based data model. If there are more tables, then the next table title is located at block 40 and the steps at blocks 42–52 are repeated. However, if there are no more tables in the document-based data model, the schema definition ends at block 56.

After the data definitions for the document-based data model have been generated, they are sent to either the engineering databases 22 or the engineering software applications 24. The data definitions stored in the engineering database and the engineering software applications are accessed by using the computer 26. Those skilled in the art will appreciate that the data definition generator 10 is easy to use, capable of being integrated with an engineering computing environment, and reduces the design and manufacturing cycle time of particular projects.

It is therefore apparent that there has been provided in accordance with the present invention, a method and system for generating document-based data definitions for a document-based data model that fully satisfies the aims and advantages and objectives hereinbefore set forth. The invention as been described with reference to several embodiments. However, it will be appreciated that variations and modification can be effected by a person of ordinary skill in the art without departing from the scope of the invention.

I claim:

1. A document-based data definition generator, comprising:

means for receiving a document-based data model having a plurality of tables located therein, each of the plurality of tables containing information describing an object, the information describing attributes of the object and their various characteristics, each table having a title, headings, and rows of data for each heading describing the characteristics of the attributes; means for locating a table within the document-based data model;

means for initializing a schema definition for the located table, the schema definition defining the attributes and the characteristics of the object;

means for identifying the table title and initializing an entity definition for the defined schema, the entity definition describing the object embodied in the table;

means for interpreting the attributes and information describing the various characteristics of the attributes listed in each table heading and table row;

means for adding the attributes and information in each table row; and means for generating a data definition for the information in the table according to the defined schema, entity, and attributes.

2. A document-based data definition generator according to claim 1, further comprising means for furnishing the generated data definitions to an engineering database.

3. A document-based data definition generator according to claim 1, further comprising means for furnishing the generated data definitions to an engineering software application.

4. A document-based data definition generator according to claim 1, further comprising means for integrating the generated data definitions in an integrated engineering computing environment.

5. A method for generating document-based data definitions for computer generated document-based data models, comprising the steps of:

receiving a document-based data model having a plurality of tables located therein, each of the plurality of tables containing information describing an object, the information describing attributes of the object and their various characteristics, each table having a title, headings, and rows of data for each heading describing the characteristics of the attributes;

locating a table within the document-based data model;

initializing a schema definition for the located table, the schema definition defining the attributes and the characteristics of the object;

identifying the table title and initializing an entity definition for the defined schema, the entity definition describing the object embodied in the table;

interpreting the attributes and information describing the various characteristics of the attributes listed in each table heading and table row;

adding the attributes and information in each table row; and generating a data definition for the information in the table according to the defined schema, entity, and attributes.

6. A method according to claim 5, further comprising the step of furnishing the generated data definitions to an engineering database.

7. A method according to claim 5, further comprising the step of furnishing the generated data definitions to an engineering software application.

8. A method according to claim 5, further comprising the step of integrating the generated data definitions in an integrated engineering computing environment.

* * * * *